July 31, 1928.

A. J. WEATHERHEAD, JR 1,678,927

DRAIN COCK OR VALVE

Filed April 13, 1927   2 Sheets-Sheet 1

Inventor
A. J. WEATHERHEAD JR.

By
Attorney

July 31, 1928.

A. J. WEATHERHEAD, JR 1,678,927

DRAIN COCK OR VALVE

Filed April 13, 1927

2 Sheets-Sheet 2.

Inventor

A. J. WEATHERHEAD Jr.

By

Attorney

Patented July 31, 1928.

1,678,927

UNITED STATES PATENT OFFICE.

ALBERT J. WEATHERHEAD, JR., OF CLEVELAND, OHIO.

DRAIN COCK OR VALVE.

Application filed April 13, 1927. Serial No. 183,370.

My invention relates to an improvement in drain cocks, and my object in general is to provide a simple and inexpensive drain cock made of three parts or pieces. These parts are particularly constructed to promote convenient assembly. The parts are also arranged to promote rapid flow and unrestricted discharge therethrough when the main valve part is opened. The valve member and body part are also particularly constructed to permit the valve member to be easily introduced into the valve body and freely operated therein but to prevent accidental disconnection therefrom, all as hereinafter shown and described and more particularly pointed out in the claims.

Figure 1:
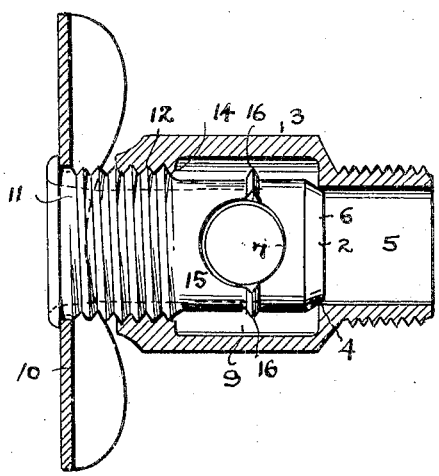
Figure 2:
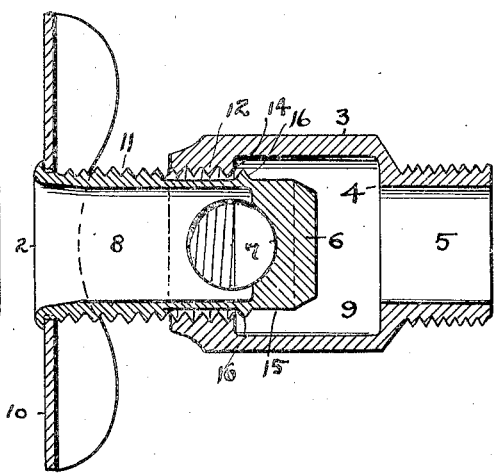
Figure 3:
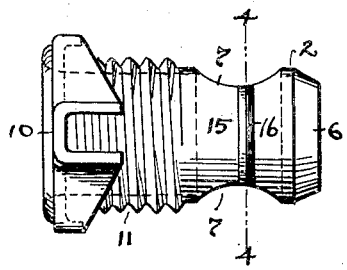
Figure 4:
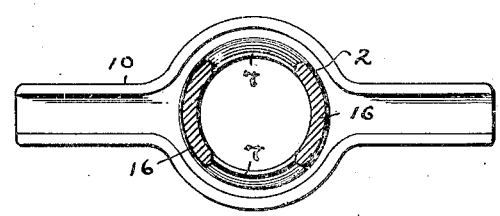
Figure 9:
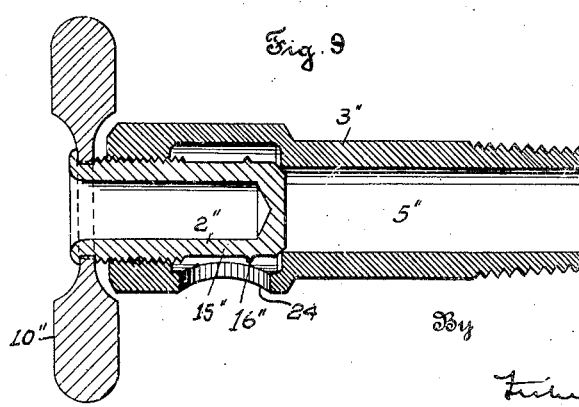
Figure 5:
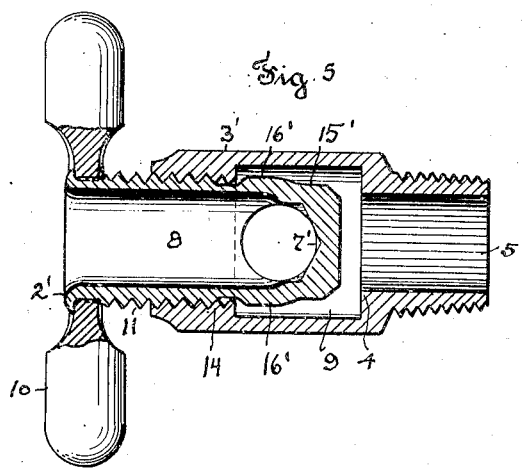
Figure 7:
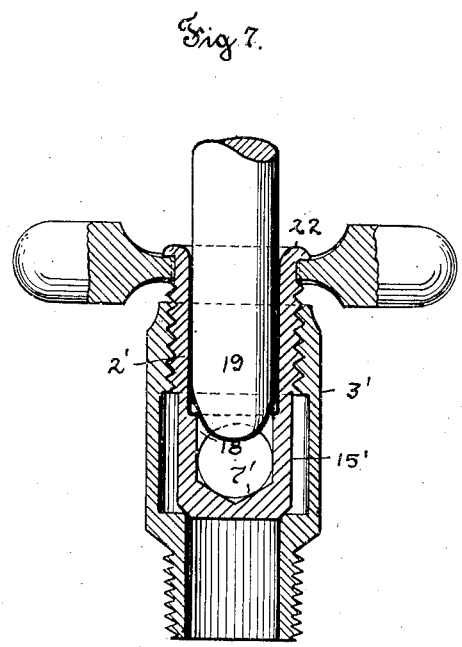
Figure 8:
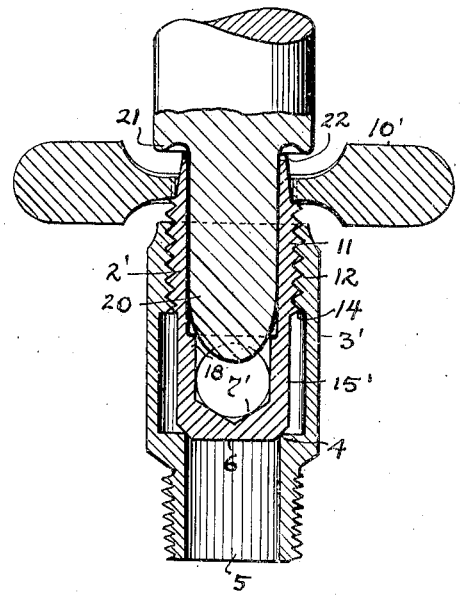

In the accompanying drawings, Fig. 1 is a sectional view of a drain cock embodying my improvement, showing the valve member seated, and Fig. 2 is a similar view showing the valve member partly disconnected from the valve body but still interlocked therewith. Fig. 3 is a side elevation of the valve member, and Fig. 4 is a transverse section on line 4—4 of Fig. 3. Fig. 5 is a longitudinal section, and Fig. 6 a transverse section, of a drain cock embodying a modified form of the invention. Figs. 7 and 8 are sectional views illustrating certain steps in the manufacture of the drain cock shown in Fig. 5. Fig. 9 is a sectional view of a modified form of drain cock embodying a feature of the invention.

The invention comprises a drain cock or valve in which a tubular valve member 2 is adapted to extend into a tubular body 3 to engage a sharp-edged valve seat 4 and close the fluid passage or entrance 5 therein. The inner closed end 6 of member 2 is beveled to engage the sharp edge or seat 4, and a pair of openings 7 in the opposite sides of member 2 communicates with the inner end of the longitudinal bore or passage 8 in member 2 to permit escape of the fluid from the enlarged chamber 9 in body 3 when member 2 is unseated. A handle 10 is affixed to the open outer end of member 2, and the front end 11 of this member is screw-threaded to engage complementary screw-threads 12 within the neck or front end of body 3, whereby longitudinal shift of member 2 within body 3 may be effected by rotating the handle and said member. As shown, the screw-threads are standard V-shaped threads, and the screw-threads 12 in the neck of body 3 are relatively short, that is they extend only a short distance into the body and terminate at a shoulder 14 at the front end of enlarged chamber 9. The smoothly finished inwardly-extending cylindrical portion 15 of member 2 is of smaller diameter than its screw-threaded part so that said members may be freely rotated to open and close the fluid passage, but such free rotatable movement is limited and the withdrawal or outward movement of member 2 is definitely restricted to avoid accidental separation of said member from body 2, preferably by a slight enlargement of cylindrical portion 15. For example, portion 15 may be formed with a V-shaped rib or ribs 16 annularly thereof intermediate its length to prevent free disconnection of member 2 from body 3, and this rib is placed sufficiently remote from the inner terminus of the screw-threaded portion on member 2 so that it will not interfere with the rotatable movement of said member in opening the drain cock to the limit of its drainage capacity. Moreover the enlargement or rib on portion 15 is preferably located circumferentially thereof between the two side openings 7, or divided into two segmental parts of a circle by said openings 7, and the diameter of this rib or enlargement of cylindrical portion 15 is preferably less or smaller than the base of the V-shaped screw-thread in the neck of the body 3. Thus in introducing member 2 into the screw-threaded neck of body 3 the segmental parts of the rib may be forced to travel in the screw-thread channel until the ribs emerge into chamber 9 beyond shoulder 14, all without mutilating the screw-thread. It is also possible to disconnect member 2 from body 3 by a reverse rotative movement providing each rib segment 16 is forced into the screw-thread channel at the beginning of such reverse movement. Otherwise the rib will act as a stop and merely ride endlessly against shoulder 14 within body 2, especially as the screw-threads on member 2 are then completely free and disconnected from the screw-threads within the neck of body 3, as seen in Fig. 2. Furthermore, when member 2 is no longer screw-connected with body 3, said member drops by gravity out of axial alignment with the screw-threaded bore in the body, because the smooth cylindrical portion 15 is of reduced diameter as compared with said screw-threaded bore. The handle end of member 2 being the heavier, said member also tilts slightly when in the partly disconnected relation as stated, all of which makes it difficult for said parts to become accidentally separated although facilitating manual assembly and separation in manufacture and during use.

Figure 6:
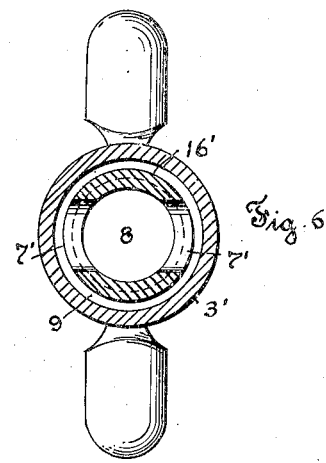

In Figs. 5 and 6, I show a drain cock constructed in the main in the same way as hereinbefore described, except that instead of forming a rib 16 on cylindrical portion 15' I enlarge this part by expanding the cylindrical wall slightly opposite openings 7', subsequent to introducing member 2' into body 3'. The annular enlargement 16' thus formed in portion 15' prevents withdrawal and separation of member 2' from body 3', although permitting the valve to be opened and closed after being connected together. One method of enlarging portion 15' is exemplified in Fig. 7, wherein portion 15' is shown as having a bore 18 of reduced diameter at its inner end where provided with a side opening 7'. A round or tapering tool 19 is pressed downwardly, while rotating, into bore 18, thereby expanding the wall to the larger dimensions shown in Fig. 5. Fig. 8 illustrates a slightly modified form of tool 20 having an annular enlargement 21 which is adapted to flange or peen the outer end 22 of member 2' over the separate handle 10' while the lower reduced rounded end of the tool is expanding or enlarging cylindrical extension 15' in the same operation. A drain cock or valve constructed as described herein comprises only three pieces or parts,— a body part, a valve member, and a handle. Referring to Figs. 1 and 2, the fluid outlet passage 8 in the valve member is of equal diameter to the fluid entrance 5 in the body, and the combined area of the two side openings 7 in the valve member is obviously greater than passage 8. Chamber 9 in body 3 is considerably larger in diameter than the tubular valve member 2, and the length of this chamber is much greater than the diameter of the side openings 7 so that when the valve member is unscrewed but still screw-connected to the body said side openings will still be exposed within chamber 9 and a free and unobstructed outflow to the full capacity of passage 5 may be had. Quick draining or discharge may thus be effected with a comparatively small drain cock of this kind, and in that connection it should be understood that the drawings are made on a larger scale than many of the actual sizes of drain cocks of that type which have gone into extensive use.

In Fig. 9 I show a drain cock comprising a closed valve member 2" having screw-threaded connection with a body member 3" formed with a discharge opening 24 in its side. This valve member 2" has an elongated cylindrical portion 15" adapted to close the entrance 5", and a small fin or V-shaped rib 16" on portion 15" serves to limit the movement of the valve member in respect to the body and prevents accidental disconnection therefrom in the same way as the rib 16 in the drain cock shown in Figs. 1 and 2.

What I claim, is:

1. A drain cock or valve, comprising a main body having a screw-threaded opening and a valve seat therein, a valve member having a screw-threaded portion adapted to operate within said screw-threaded opening and formed with a reduced cylindrical portion extending into said body beyond the screw-threads therein, said cylindrical portion having a slightly enlarged circumferential portion adapted to check the outward movement of said valve member when it is unscrewed from said body.

2. A drain cock or valve, comprising a main body having a valve seat, and a valve member in screw-connection with said body having a longitudinal discharge passage therein and a side opening at the inner end of said passage, said member also having its inner portion enlarged in the zone of said side opening to limit the opening movement of said valve member.

3. A drain cock or valve, comprising a main body having a valve seat, a valve member having a screw-threaded portion engaged with corresponding screw-threads in said body, said valve member having a side opening at its inner end and a longitudinal discharge passage at its outer end communicating therewith, and a segmental rib on the inner portion of said valve member adapted to encounter the screw-threads in said body and prevent easy disconnection of said member from said body.

4. A drain cock or valve, comprising a body having an intake passage at one end and a screw-threaded opening at its opposite end, a valve member adapted to close said passage having a screw-thread portion adapted to operate within said screw-threaded opening, said member having an opening in its side at its inner end and a longitudinal passage extending therefrom to its outer end, the inner end of said member being of slightly reduced diameter as compared with its threaded portion and formed with an annular rib externally thereof adapted to prevent ready removal of said member from said body.

5. A drain cock or valve, comprising a body having a screw-threaded opening at one end thereof, and a cylindrical valve member having a screw-threaded portion adapted to operate within said opening and provided with a lateral projection at its inner portion of a size to permit a forced travel thereof along the screw-threads of said opening.

6. A drain cock or valve, comprising a body having an intake passage at one end and an enlarged chamber and valve seat at the inner end of said passage and provided with a screw-threaded opening at the opposite end of said body, and a valve member having an axial discharge opening therein and a screw-threaded portion at its outer end adapted to operate within said screw-threaded opening and provided with a cylindrical inner end portion of slightly reduced diameter having side openings and narrow ribs circumferentially thereof between said side openings, said ribs being adapted to check the removal of said member through the screw-threaded opening in said body.

In testimony whereof I affix my signature.

ALBERT J. WEATHERHEAD, Jr.